(12) United States Patent
Stillinger et al.

(10) Patent No.: US 10,330,018 B2
(45) Date of Patent: Jun. 25, 2019

(54) INTEGRATING DESIGN AND FIELD MANAGEMENT OF GAS TURBINE ENGINE COMPONENTS WITH A PROBABILISTIC MODEL

(71) Applicant: Rolls-Royce Corporation, Indianapolis, IN (US)

(72) Inventors: Jeffrey D. Stillinger, Lebanon, IN (US); Zachary J. Grey, Indianapolis, IN (US); Rhoderik J. Fitzpatrick, Westfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 563 days.

(21) Appl. No.: 14/631,101

(22) Filed: Feb. 25, 2015

(65) Prior Publication Data
US 2015/0269490 A1    Sep. 24, 2015

Related U.S. Application Data

(60) Provisional application No. 61/969,366, filed on Mar. 24, 2014.

(51) Int. Cl.
*F02C 9/00* (2006.01)
*G06N 7/00* (2006.01)

(52) U.S. Cl.
CPC .............. *F02C 9/00* (2013.01); *G06N 7/005* (2013.01)

(58) Field of Classification Search
None
See application file for complete search history.

(56) References Cited

U.S. PATENT DOCUMENTS

| | | |
|---|---|---|
| 6,757,668 B1 | 6/2004 | Goebel et al. |
| 7,020,595 B1 | 3/2006 | Adibhatla et al. |
| 7,457,785 B1 | 11/2008 | Greitzer et al. |
| 7,769,507 B2 | 8/2010 | Volponi et al. |
| 7,945,523 B2 | 5/2011 | Hofmann et al. |
| 8,099,181 B2 | 1/2012 | Sterzing et al. |
| 8,250,014 B2 | 8/2012 | Schneega et al. |
| 8,250,017 B2 | 8/2012 | Pandey et al. |
| 8,380,646 B2 | 2/2013 | Hans et al. |
| 8,396,870 B2 | 3/2013 | Birdwell et al. |

(Continued)

OTHER PUBLICATIONS

Extended European Search Report dated Feb. 1, 2016 for European Application No. 15160416.2-1951 / 2930665, 9 pages.

(Continued)

*Primary Examiner* — Robert A Cassity
*Assistant Examiner* — Michael Zidanic
(74) *Attorney, Agent, or Firm* — Barnes & Thornburg LLP

(57) ABSTRACT

Embodiments of a gas turbine engine lifecycle decision assistant apply a probabilistic-based process founded on a Bayesian mathematical framework to intelligently combine analytical models, expert judgment, and data during the development and field management of gas turbine engines. The process integrates physics-based and high-fidelity models with data and expert judgment that evolves over the course of the gas turbine engine lifecycle. Among other things, embodiments of the gas turbine engine lifecycle decision assistant can improve future predictive models and understanding while at the same time reducing risk and uncertainty in the service management of existing products.

20 Claims, 5 Drawing Sheets

(56) References Cited

U.S. PATENT DOCUMENTS

| | | | |
|---|---|---|---|
| 2002/0040278 A1* | 4/2002 | Anuzis | G01H 1/00 702/56 |
| 2011/0167025 A1 | 7/2011 | Danai et al. | |
| 2011/0213746 A1 | 9/2011 | Botonjic-Sehic et al. | |
| 2012/0136819 A1 | 5/2012 | Pandey et al. | |
| 2012/0226474 A1 | 9/2012 | Sanchez et al. | |
| 2013/0184838 A1* | 7/2013 | Tchoryk, Jr. | G05B 13/042 700/31 |
| 2014/0324363 A1* | 10/2014 | Reinman | G07C 3/08 702/34 |

OTHER PUBLICATIONS

Mavris et al., "Assessment of Uncertainty in Aerospace Propulsion System Design and Simulation", Dec. 31, 2003, available at https://smartech.gatech.edu/bitstream/handle/1853/6421/JANNAF03_final_manuscript.pdf?sequence=1, 10 pages.

Mast et al., "Bayesian Belief Networks for Fault Identification in Aircraft Gas Turbine Engines", Control Applications, 1999, Proceedings of the 1999 IEEE International Conference on Kohala Coast, HI, USA Aug. 22-27, 1999, vol. 1, 6 pages.

Baudrit et al., "Joint Propagation of Probability and Possibility in Risk Analysis: Towards a Formal Framework", International Journal of Approximate Reasoning, Elsevier Science, New York, NY, US, vol. 45, No. 1, May 7, 2007, 16 pages.

Choi et al., "Fatigue life prediction based on Bayesian Approach to Incorporate Field Data into Probability Model Dawn An 1a", Structural Engineering and Mechanics, Jan. 31, 2011, available at http://www2.mae.ufl.edu/nkim/Papers/paper50.pdf.

Clifton A. D., McGrogan N., Tarassenko L., King D., King S., Anuzis P.; Bayesian Extreme Value Statistics for Novelty Detection in Gas-Turbine Engines; IEEEAC paper # 1461, Version 3, Updated Dec. 10, 2007.

Neil M., Fenton N., Nielsen L.; Building Large-Scale Bayesian Network; Risk Assessment and Decision Analysis Research (RADAR) Group, Computer Science Department, Queen Mary and Westfield College, University of London and Agenda Ltd, London, UK, Hugin Expert A/S, Aalborg, Denmark. The Knowledge Engineering Review, vol. 15:3, 2000, 257-284.

O'Hagan A., Bayesian Analysis of Computer Code Outputs: A Tutorial; University of Sheffield, UK, Aug. 11, 2004.

Eklund H. W. N., Qui H., Yan W., Hu X., Multi-classifier Fusion for Assessing the Health of Aircraft Engines; AIAA ASC Structures, Structural Dynamics, and Materials Conference, Apr. 12-15, 2010, Orlando, Florida.

European Official Action dated Sep. 18, 2012 and issued in connection with EP Appln. No. 15160416.2, 7pgs.

\* cited by examiner

INTEGRATING DESIGN AND FIELD MANAGEMENT OF GAS TURBINE ENGINE COMPONENTS WITH A PROBABILISTIC MODEL

CROSS REFERENCE TO RELATED APPLICATIONS

This application claims the benefit of and priority to U.S. Provisional Patent Application Ser. No. 61/969,366, filed Mar. 24, 2014, which is incorporated herein by this reference in its entirety.

FIELD OF THE DISCLOSURE

The present disclosure relates generally to an application of probabilistic mathematical models to the design and field management of gas turbine engine components and other manufactured components. Additionally, the present disclosure relates to mathematical techniques for identifying and quantifying variability and uncertainty over the lifecycle of a manufactured component, such as a gas turbine engine component.

BACKGROUND

Information needed to make a critical decision regarding the design or field management of one or more manufactured components, such as a gas turbine engine component, can be developed during any phase of the component's lifecycle. A decision can be improved by reducing uncertainty in the data used as the basis for the decision. In the gas turbine engine industry, there are many different potential sources of uncertainty, and the sources of uncertainty may change over the course of a component's lifecycle.

Due to the complex nature of gas turbine engine systems and the associated mathematical predictions, existing decision tools do not provide a closed-form mathematical solution for the gas turbine engine industry. Existing empirical models and system architectures attempt to approximate system behavior based on extensive testing and analysis. However, for representative testing and analysis to be applied, existing systems need to assume certain environmental and operational boundary conditions. These assumptions constrain the relevant design domain that may satisfy a particular belief about the empirical parameter estimates or system interactions. Extrapolation of models with empirical parameter estimates or assumed system influence bounded by the boundary condition assumptions has often resulted in inaccurate determinations of real-world component behavior in service. The resultant implications include increased costs due to overly conservative design practices and inaccurate predictions leading to component failure in operation.

A probabilistic model, such as a Bayesian network, can be used to depict relationships between random variables and their conditional dependencies as a graph in which the random variables are represented as nodes, the conditional dependencies are designated by the edges between the nodes, and the lack of an edge between two nodes indicates that the random variables represented by the unconnected nodes are conditionally independent of one another. A probability distribution is associated with each of the nodes in the model.

SUMMARY

The present application discloses one or more of the features recited in the appended claims and/or the following features which, alone or in any combination, may comprise patentable subject matter.

In an example 1, according to at least one embodiment of this disclosure, a gas turbine engine lifecycle decision assistance system for understanding and quantifying uncertainties during the lifecycle of one or more gas turbine engine components, includes, embodied in one or more machine-accessible storage media: a bidirectional probabilistic analysis subsystem including a probabilistic model of conditional dependencies between a plurality of random variables associated with a plurality of different sources of uncertainty in the gas turbine engine component lifecycle, the probabilistic model arranged to connect at least two of the plurality of different sources of uncertainty by a common random variable, the bidirectional probabilistic analysis subsystem to: compute a joint probability distribution for the probabilistic model; periodically receive new evidence from one or more of the different sources of uncertainty over the course of the component lifecycle; and in response to the new evidence, re-compute the joint probability distribution.

An example 2 includes the subject matter of example 1, wherein the bidirectional probabilistic analysis subsystem computes the joint probability distribution using at least two random variables that are associated with different sources of uncertainty. An example 3 includes the subject matter of example 1 or example 2, wherein the bidirectional probabilistic analysis subsystem computes the joint probability distribution using different sources of uncertainty that are connected by a common random variable. An example 4 includes the subject matter of any of the preceding examples, wherein the bidirectional probabilistic analysis subsystem computes the joint probability distribution in response to a request for a quantification of uncertainty relating to an aspect of the gas turbine engine component lifecycle. An example 5 includes the subject matter of example 4, wherein the bidirectional probabilistic analysis subsystem receives the request from a component design subsystem and/or a field management subsystem and the bidirectional probabilistic analysis subsystem communicates the re-computed joint probability distribution to the component design subsystem and/or the field management subsystem. An example 6 includes the subject matter of any of the preceding examples, wherein the bidirectional probabilistic analysis subsystem connects the plurality of different sources of uncertainty in the gas turbine engine component lifecycle to the probabilistic model, and wherein at least one of the different sources of uncertainty relates to a pre-production certification phase of the component lifecycle and at least one of the different sources of uncertainty relates to a post-production certification phase of the component lifecycle. An example 7 includes the subject matter of any of the preceding examples, wherein the bidirectional probabilistic analysis subsystem connects the plurality of different sources of uncertainty in the gas turbine engine component lifecycle to the probabilistic model, and wherein at least one of the different sources of uncertainty relates to a pre-production certification phase of the component lifecycle including one or more of a design phase, a manufacture phase, and a test phase. An example 8 includes the subject matter of any of the preceding examples, wherein the bidirectional probabilistic analysis subsystem connects the plurality of different sources of uncertainty in the gas turbine engine component lifecycle to the probabilistic model, and wherein at least one of the different sources of uncertainty relates to a post-production certification phase of the component lifecycle including one or more of a use phase, and a service phase. An example 9 includes the subject matter of any of the preceding examples, wherein the bidirectional probabilistic analysis subsystem connects the plurality of different sources of uncertainty in the gas turbine engine component lifecycle to the probabilistic model, and wherein the plurality of different sources of uncertainty include at least one analytical model, at least one source of empirical data, and at least one source of expert knowledge. An example 10 includes the subject matter of any of the preceding examples, wherein the probabilistic model includes a Bayesian network.

In an example 11, a method for quantifying uncertainty during different phases of the lifecycle of a manufactured component includes, with at least one computing device: identifying at least two sources of uncertainty that are associated with different phases of the manufactured component lifecycle; connecting the at least two sources of uncertainty by a common random variable in a Bayesian network; and computing a joint probability distribution for the Bayesian network using the common random variable and at least one random variable associated with each of the at least two sources of uncertainty. An example 12 includes the subject matter of example 11, including receiving new evidence relating to at least one of the random variables and propagating the new evidence through the Bayesian network. An example 13 includes the subject matter of example 12, including forward-propagating the new evidence through the Bayesian network if the new evidence relates to an early phase of the gas turbine engine lifecycle. An example 14 includes the subject matter of example 13, including back-propagating the new evidence through the probabilistic model if the new evidence relates to a later phase of the gas turbine engine lifecycle. An example 15 includes the subject matter of any of examples 11-14, including computing the joint probability distribution in response to a request for a quantification of uncertainty relating to an aspect of the manufactured component lifecycle. An example 16 includes the subject matter of example 15, including receiving the request from a component design subsystem and/or a field management subsystem and communicating the joint probability distribution to the component design subsystem and/or the field management subsystem. An example 17 includes the subject matter of any of examples 11-16, including connecting a source of uncertainty relating to a pre-production certification phase of the component lifecycle to the Bayesian network. An example 18 includes the subject matter of any of examples 11-17, including connecting a source of uncertainty relating to a post-production certification phase of the component lifecycle to the Bayesian network. An example 19 includes the subject matter of any of examples 11-18, including connecting at least one analytical model, at least one source of empirical data, and at least one source of expert knowledge to the Bayesian network. An example 20 includes the subject matter of example 19, including propagating output of the at least one analytical model, output of the at least one source of empirical data, and output of the at least one source of expert knowledge through the Bayesian network. An example 21 includes a computing device including a processor and memory having stored therein a plurality of instructions that when executed by the processor cause the computing device to perform the method of any of examples 11-20. An example 22 includes one or more machine readable storage media including a plurality of instructions stored thereon that in response to being executed result in a computing device performing the method of any of examples 11-20.

In an example 23, a gas turbine engine lifecycle decision assistant for understanding and quantifying uncertainties during the lifecycle of a gas turbine engine component includes computer program instructions embodied in one or more machine-accessible storage media and executable by at least one processor to: create a Bayesian network of conditional dependencies between a plurality of random variables associated with a plurality of different sources of uncertainty in the gas turbine engine component lifecycle, the Bayesian network arranged to connect at least two of the plurality of different sources of uncertainty by a common random variable; compute a joint probability distribution for the Bayesian network; receive new evidence from one or more of the different sources of uncertainty over the course of the component lifecycle; and in response to the new evidence, re-compute the joint probability distribution.

An example 24 includes the subject matter of example 23, wherein the computer program instructions are to compute the joint probability distribution using at least two random variables that are associated with different sources of uncertainty. An example 25 includes the subject matter of example 23 or example 24, wherein the computer program instructions are to compute the joint probability distribution using different sources of uncertainty that are connected by a common random variable. An example 26 includes the subject matter of any of examples 23-25, wherein the computer program instructions are to compute the joint probability distribution in response to a request for a quantification of uncertainty relating to an aspect of the gas turbine engine component lifecycle. An example 27 includes the subject matter of example 26, wherein the computer program instructions are to receive the request from a component design subsystem and/or a field management subsystem and communicate the re-computed joint probability distribution to the component design subsystem and/or the field management subsystem. An example 28 includes the subject matter of any of examples 23-27, wherein the computer program instructions are to connect the plurality of different sources of uncertainty in the gas turbine engine component lifecycle to the Bayesian network, and wherein at least one of the different sources of uncertainty relates to a pre-production certification phase of the component lifecycle and at least one of the different sources of uncertainty relates to a post-production certification phase of the component lifecycle. An example 29 includes the subject matter of any of examples 23-28, wherein the computer program instructions are to connect the plurality of different sources of uncertainty in the gas turbine engine component lifecycle to the Bayesian network, and wherein the plurality of different sources of uncertainty include at least one analytical model, at least one source of empirical data, and at least one source of expert knowledge.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
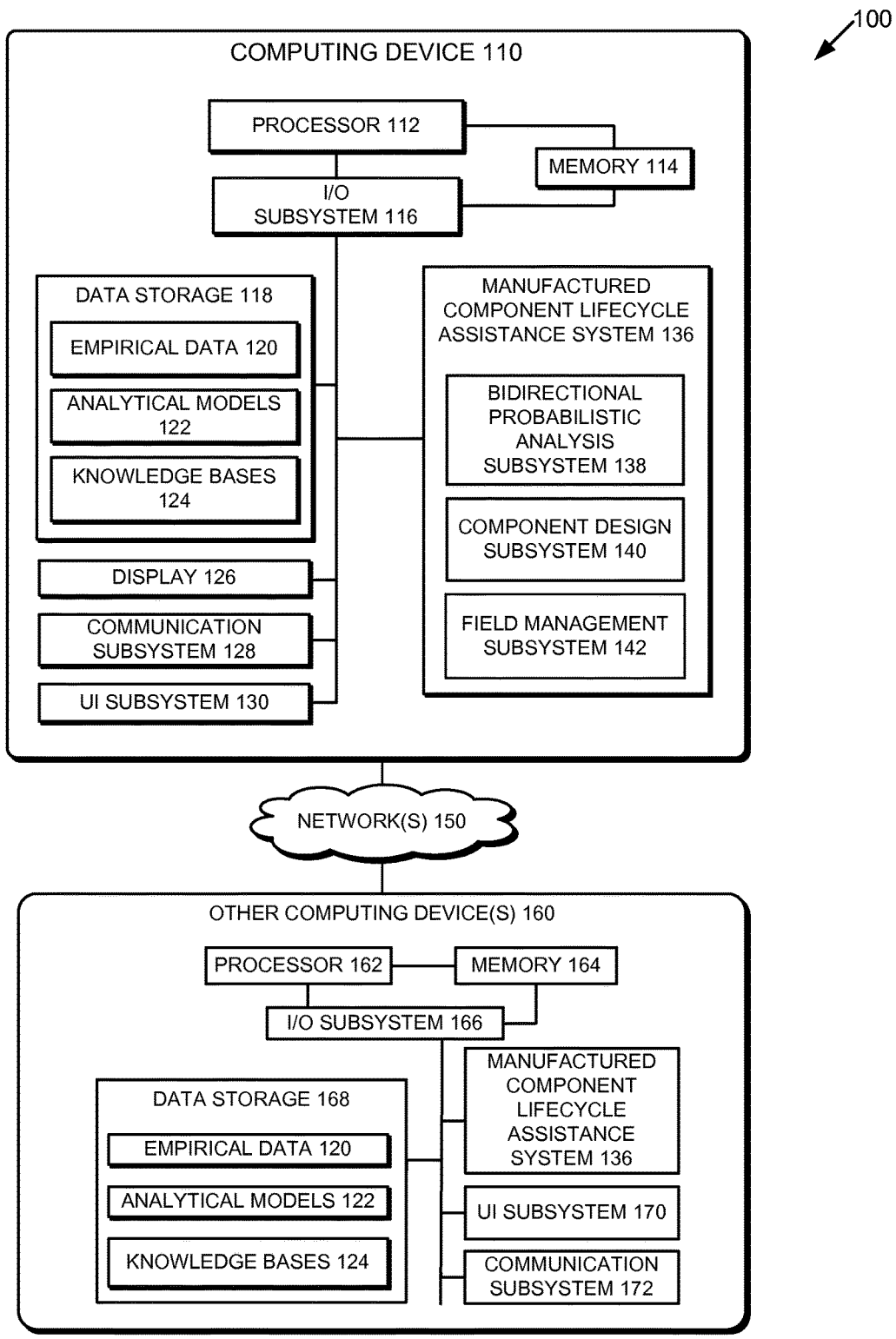
FIG. 1 is a simplified block diagram of at least one embodiment of a computing system for integrating the design and field management of manufactured components using a probabilistic model, as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Referring to FIG. 1, one or more embodiments of a manufactured component lifecycle assistance system 136 can be used to investigate and refine model estimations of empirical-based parameters and general uncertain system interactions by integrating diverse sources of uncertainty that arise in different phases of a manufactured component's lifecycle. The illustrative system 136 enables the periodic or continuous estimation of empirical modeling parameters and system architectures based on service evaluations of real life component phenomena. One or more embodiments of the system 136 can periodically or continuously monitor and diagnose service and operational data of manufactured components (such as gas turbine engines or components thereof) to determine, for example, reasonable service limits.

The system 136 can exploit service and operational data using, for instance, a Bayesian framework, in order to update beliefs about empirical model predictions that are traditionally based on measurements, and thereby improve the understanding of complex system interactions over the course of the component's entire lifecycle. In some embodiments, the system 136 uses data collected during the operation and service of critical features of manufactured components in order to refine prior estimates of empirical design parameters and to update pre-existing beliefs relating to the components' lifecycle.

Figure 2:
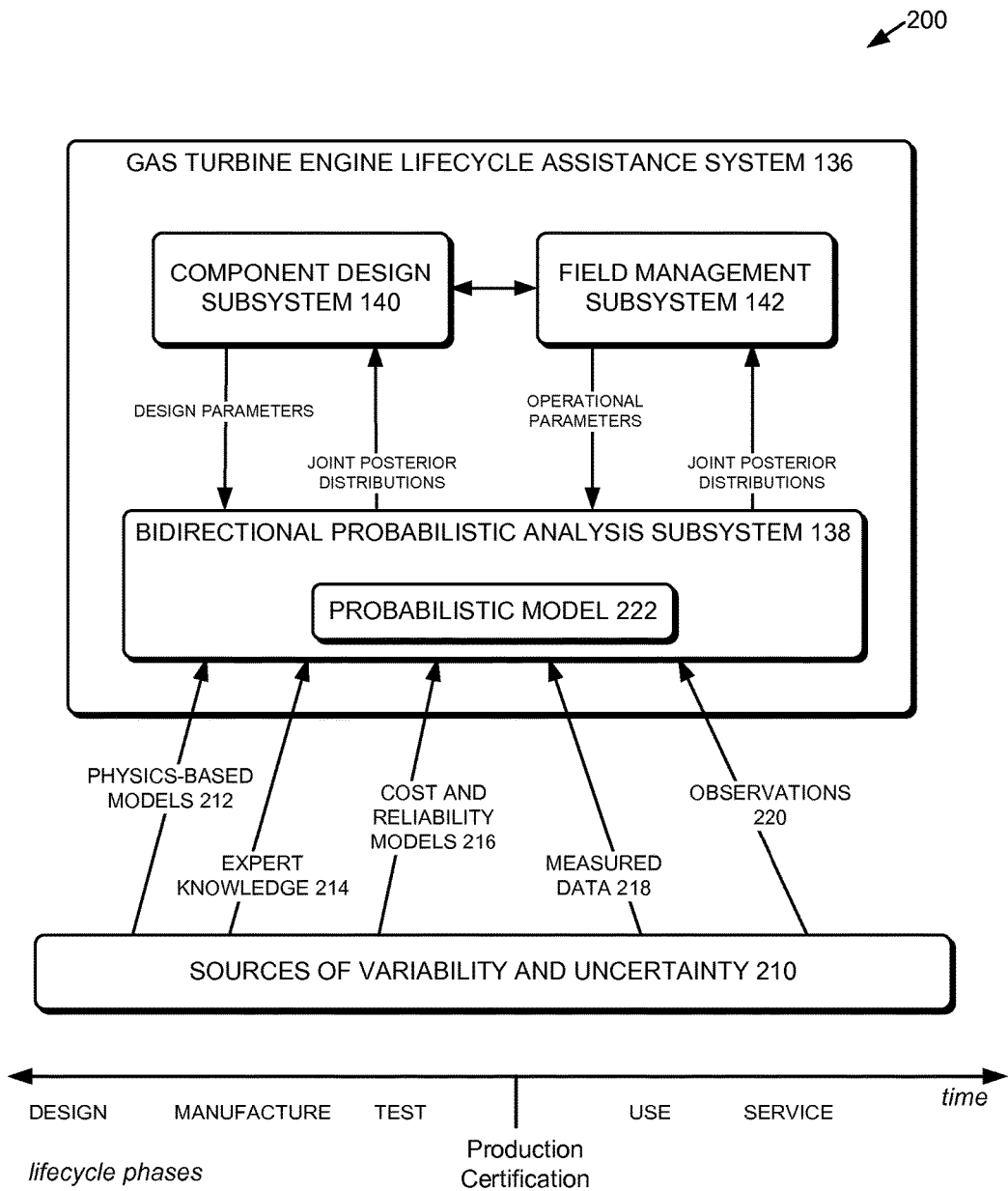
FIG. 2 is a simplified module diagram of at least one embodiment of an environment that may be established during operation of the computing system of FIG. 1.

As shown in FIG. 2, the system 136 integrates a number of complex, inter-related tools, technologies, physics-based models, cost and reliability models, and expert knowledge (for instance all of those tools, technologies, models, and knowledge used in a gas turbine engine engineering process), via a probabilistic model 222. As a result, empirical data collected on manufactured components (e.g., turbine engines or components thereof) both before and after entry into service can be used to inform a variety of different technical and business decisions related to the component, its design, its usage, and/or its maintenance.

The system 136 allows many uncertainties and their respective sources to be identified, quantified, and integrated during the design and development of a manufactured component, using physics-based models and other types of analytical models. In this way, the system 136 provides an initial understanding of the limits of a component's operational usage and performance capabilities before the component receives production certification. Additionally, however, the system 136 enables the back-propagation of information relating to actual component usage, performance, and maintenance, which is collected or observed after production certification, as well as information relating to highly uncertain external factors (such as economic climate and technical advances in the relevant industry), which can change over the course of the component's lifecycle. The system 136 thus blends complex, cross-functional physics-based models, expert knowledge, and measured data to quantify variability and uncertainty over the entire lifecycle of a manufactured component. To do this, the probabilistic model 222 utilizes a mathematical tool, such as a Bayesian network, to integrate the various sources of uncertainty in the different phases of the component's lifecycle, and thereby enables the probabilistic design and field management of a manufactured product, such as a gas turbine engine or a component thereof, in a holistic, system-wide way. Among other things, the system 136 can enhance decision making by linking safety, performance, and economic parameters with the component design.

Referring now in more detail to FIG. 1, an embodiment of a computing system 100 for integrating the design and field management of a manufactured component using a probabilistic model is shown. The illustrative computing system 100 includes at least one computing device 110, which has embodied therein the manufactured component lifecycle assistance system 136, including a bidirectional probabilistic analysis subsystem 138, a component design subsystem 140, and a field management subsystem 142.

The computing device 110 includes hardware and/or software components that are capable of performing the functions disclosed herein, including the functions of the manufactured component lifecycle assistance system 136, the bidirectional probabilistic analysis subsystem 138, the component design subsystem 140, and the field management subsystem 142. As shown, the computing system 100 may include one or more other computing devices 160 (e.g., servers, mobile computing devices, etc.), which may be in communication with each other and/or the computing device 110 via one or more communication networks 150, in order to perform one or more of the disclosed functions. The illustrative computing device 110 includes at least one processor 112 (e.g. a controller, microprocessor, microcontroller, digital signal processor, etc.), memory 114, and an input/output (I/O) subsystem 116. The computing device 110 may be embodied as any type of computing device such as a desktop computer, laptop computer, or mobile device (e.g., a tablet computer or smart phone), a server, an enterprise computer system, a network of computers, a combination of computers and other electronic devices, or other electronic devices. Although not specifically shown, it should be understood that the I/O subsystem 116 typically includes, among other things, an I/O controller, a memory controller, and one or more I/O ports. The processor 112 and the I/O subsystem 116 are communicatively coupled to the memory 114. The memory 114 may be embodied as any type of suitable computer memory device (e.g., volatile memory such as various forms of random access memory).

The I/O subsystem 116 is communicatively coupled to a number of hardware and/or software components, including a data storage device 118, a display 126, a communication subsystem 128, a user interface subsystem 130, and the manufactured component lifecycle assistance system 136. The data storage device 118 may include one or more hard drives or other suitable persistent data storage devices (e.g., flash memory, memory cards, memory sticks, and/or others). Empirical data 120, analytical models 122, knowledge bases 124, or portions thereof, may reside at least temporarily in the data storage device 118 and/or other data storage devices of the computing system 100 (e.g., data storage devices that are "in the cloud" or otherwise connected to the computing device 110 by a network 150, such as a data storage device 168 of another computing device 160). Portions of the manufactured component lifecycle assistance system 136 may reside at least temporarily in the data storage device 118 and/or other data storage devices 168 that are part of the computing system 100. Portions of the empirical data 120, the analytical models 122, the knowledge bases 124, and/or the manufactured component lifecycle assistance system 136 may be copied to the memory 114 during operation of the computing device 110, for faster processing or other reasons.

The display 126 may be embodied as any suitable type of digital display device, such as a liquid crystal display (LCD), and may include a touchscreen. The illustrative display 126 is configured or selected to be capable of displaying two- and/or three-dimensional graphics, including graphical models such as the example shown in FIG. 4. The communication subsystem 128 may communicatively couple the computing device 110 to other computing devices and/or systems 160 by the network(s) 150. The network(s) 150 may be embodied as, for example, a cellular network, a local area network, wide area network (e.g., Wi-Fi), personal cloud, virtual personal network (e.g., VPN), enterprise cloud, public cloud, Ethernet, and/or public network such as the Internet. The communication subsystem 128 may, alternatively or in addition, enable shorter-range wireless communications between the computing device 110 and other computing devices 160, using, for example, BLUETOOTH and/or Near Field Communication (NFC) technology. Accordingly, the communication subsystem 128 may include one or more optical, wired and/or wireless network interface subsystems, cards, adapters, or other devices, as may be needed pursuant to the specifications and/or design of the particular computing device 110. The user interface subsystem 130 includes one or more user input devices (e.g., the display 126, a microphone, a touchscreen, keyboard, virtual keypad, etc.) and one or more output devices (e.g., audio speakers, LEDs, additional displays, etc.). Each of the other computing devices 160 is embodied to include hardware and/or software components similar to those described above with reference to the computing device 110. For instance, components of the other computing devices 160 having the same name as components described above (e.g., processor 162 and processor 112, etc.) may be embodied in a similar way. Accordingly, for brevity, the description of those components is not repeated here.

The manufactured component lifecycle assistance system 136 and each of the subsystems 138, 140, 142 is embodied as one or more computer-executable components and data structures (e.g., computer hardware, software, or a combination thereof). The features and functions of the system 136 and its subsystems 138, 140, 142 are described in more detail below, with reference to FIG. 2. Particular aspects of the methods and analyses that may be performed by the various modules of the computing device 110 may vary depending on the component being analyzed and/or characteristics thereof. Accordingly, the examples described herein are illustrative and intended to be non-limiting. Further, the computing system 100 may include other components, subcomponents, and devices not illustrated in FIG. 1 for clarity of the description. In general, the components of the computing system 100 are communicatively coupled as shown in FIG. 1 by electronic signal paths, which may be embodied as any type of wired or wireless signal paths capable of facilitating communication between the respective devices and components.

Referring now to FIG. 2, an environment 200 that may be created during operation of the computing device 110 (e.g., an execution or "runtime" environment) is shown. As indicated by the timeline at the bottom of FIG. 2, the computing device 110 may operate the manufactured component lifecycle assistance system 136 during any phase of the component's lifecycle, before and/or after the production certification. Phases of the component lifecycle that occur prior to production certification typically include design, manufacture, and testing phases. After production certification, the component is used in the field and typically serviced at regular intervals before the component is retired at the end of its operational life. As mentioned above, a number of sources of variability and uncertainty 210 can arise over the course of the component lifecycle. Some examples of sources of variability and uncertainty that typically are useful prior to production certification include physics-based models 212, expert knowledge 214, and cost and reliability models 216. Examples of variability and uncertainty that typically are useful after production certification include measured data 218 and observations 220. These and other sources of variability and uncertainty 210 may be stored in computer memory as empirical data 120, analytical models 122, and knowledge bases 124. For instance, physics-based models 212 and cost and reliability models 216 are examples of analytical models 122, which may be used during the design and development of the manufactured component. As used herein, "model" may refer to, among other things, a mathematical formula, algorithm, or technique that can be used to represent correlations or relationships between or among different types of data, and may be embodied as, for example, programming code, data (e.g., lookup tables), calculations, graphs or plots. For instance, a model may be used to algorithmically predict an output that may likely result from a particular combination of inputs. Measured data 218, such as actual speed and temperature readings obtained during operational use of the manufactured component, are examples of empirical data 120. Expert knowledge 214, such as assessments and conclusions derived from measured data 218 or analytical models 122, may be organized and stored in knowledge bases 124. Each or any of the sources of variability and uncertainty 210 and the data values relating thereto may be stored in electronic files, tables, databases, or other suitable computerized data structure, including, for example, searchable data structures.

The illustrative bidirectional probabilistic analysis subsystem 138 connects each of the sources of variability and uncertainty 210 to the probabilistic model 222. To do this, the subsystem 138 connects individual nodes or clusters of nodes in the probabilistic model 222 (which may include, e.g., one or more Bayesian networks) to the sources of variability and uncertainty 210 (e.g., traditional models and tools). The subsystem 138 employs one or more adaptation algorithms to incorporate new data, or evidence, output by the sources of variability and uncertainty 210, into the probabilistic model 222. Such evidence may include output from traditional mathematical models including, but not limited to, finite element models, optimization models, regression, and response surface models. Alternatively or in addition, the subsystem 138 may employ other methods commonly used in uncertainty quantification, such as intrusive and non-intrusive methods, to connect the sources of variability and uncertainty 210 with the probabilistic model 222. An example of an approach to programmatically constructing a Bayesian network is described in Martin Neil et al., Building large-scale Bayesian networks, The Knowledge Engineering Review, Vol. 15:3, pp. 257-284 (Cambridge University Press, 2000), which is incorporated herein by this reference. However, the illustrative subsystem 138 improves upon existing models in several ways. For example, in the subsystem 138, the probabilistic model 222 is bidirectional in that it can connect elements of the probabilistic model 222 to other models in a way that allows information to be passed in both temporal directions (e.g., forward propagation of information from a development model and/or backward propagation of in-service observations).

The probabilistic model 222 links nodes or clusters of nodes in the probabilistic model (e.g., a Bayesian network) together through the traditional models and tools that are used in the applicable manufactured component industry (e.g., the gas turbine industry). In the illustrative embodiment, the uncertainties associated with time evolving, complex system of models, data, and expert knowledge involved in, for example, the gas turbine industry, are represented by a Bayesian network: The Bayesian network is constructed as an acyclic graph that defines dependencies between the nodes in the network, and probability tables are associated with each node. The nodes in the acyclic graph correspond to random variables that represent complex interactions between different physical and process models and other sources of uncertainty 210. The random variables may include model parameters and/or other quantitative and/or qualitative information that is uncertain, but useful for informing decisions. The probability tables that define the network can represent both initial and updated, or time evolved, knowledge and understanding about a manufactured component (e.g., a gas turbine engine) during any stage of the component's lifecycle. For instance, early in a turbine engine's lifecycle, Bayesian prior distributions and conditional probabilities in the probability tables can be populated using expert judgment, empirical data, or mathematical calculations. In the probabilistic model 222, these traditional models are represented simultaneously with appropriate dependencies, using random variables (e.g., material model parameters, such as elastic modulus or material density), which are common to two or more of the traditional models. While the illustrative embodiment utilizes a Bayesian network, it should be understood that other types of probabilistic graphical models, or other mathematical models, may be used in other embodiments.

In order to update the sources of variability and uncertainty 210 with information propagated through the probabilistic model 222, the system 138 periodically or continuously computes the joint posterior probability distribution represented by the probabilistic model 222 and continuously or periodically samples and supplies the joint posterior probability distribution to the component design subsystem 140 and the field management subsystem 142, to be converted to parameters that can be used as new inputs for the traditional models or other sources of variability and uncertainty 210. In turn, the output from the newly updated traditional models or other sources of variability and uncertainty 210 is used as new evidence and incorporated into the probabilistic model 222 as described above, and the process is repeated iteratively over the lifecycle of the component. As an example, an embodiment of the subsystem 138 connects traditional models, such as computational fluid dynamics, heat transfer, stress, and other physical models through the probabilistic model 222 with models such as manufacturing, material processing, raw material and finished part inspection, cost, and forecasting models. Simulation models that allow engineers to simulate processes such as machining, finish operations, and finish part inspections can also be used to quantify uncertainties in component performance and are also connected to the probabilistic model 222 as described herein. In these examples and others, the bidirectional probabilistic analysis subsystem 138 captures complex system-level sources of variability and uncertainty 210, which are represented in and by traditional models 122, expert knowledge 124, and data 120, and correlates and updates, in a mathematically rigorous way (e.g., using Bayes' Theorem), the sources of variability and uncertainty 210 when new information becomes available.

By interfacing with the bidirectional probabilistic analysis subsystem 138, the component design subsystem 140 and/or the field management subsystem 142 can provide enhanced decision support during any or all phases of the lifecycle of a manufactured component. For example, the component design subsystem 140 may submit design parameters to the subsystem 138 to determine the likelihood that a fuel consumption or temperature degradation prediction may change by changing a seal clearance during either development or in-service usage of the engine. As another example, the field management subsystem 142 may submit operational or performance parameters to the subsystem 138 to determine the likelihood that a production-certified turbine engine will actually result in the maintenance schedule predicted by a traditional model or to determine how a fuel consumption prediction for the engine design may be affected by the actual use of the component under certain specific operating conditions.

In a manufactured component industry such as the gas turbine industry, stakeholder decisions can inform business critical decisions more quickly and more accurately using the component design subsystem 140 and/or the field management subsystem 142 in connection with the bidirectional probabilistic analysis subsystem 138. The subsystem 138 can update the probabilistic model 222 (e.g., the Bayesian posterior distributions) with information that evolves over any period of time during the component life cycle, and thereby inform the direction of decisions. For example, component designers can use the system 136 early in the product life cycle to assess several aspects of a design simultaneously. Assessment in this context means that designers can determine whether, and for what specific reasons, a design fails to meet all of the pre-existing requirements. Beyond the design stage, sensitivity studies to address design shortfalls can be quickly quantified using the system 136. To do this, an embodiment of the system 136 sets all of the necessary variables to their required values and applies Bayes' rule to propagate the information forward and backward to other nodes in the Bayesian network. Later in the product life cycle, decisions having to do with actual product usage and measured performance can be made, similarly. Using the subsystem 138, the most likely reasons for engine-to-engine performance variability and operator-to-operator variability can be quantified and correlated with other variables. To this end, the subsystem 138 can use Bayesian updating to connect understanding developed prior to production certification to new knowledge gained after production certification. Given new data and the resulting changes to Bayesian posterior distributions, decision makers can quantify the expected value of performing additional analysis, additional testing, or additional measurements. Decision makers can also better quantify cost and risk of specific option paths.

Figure 3:
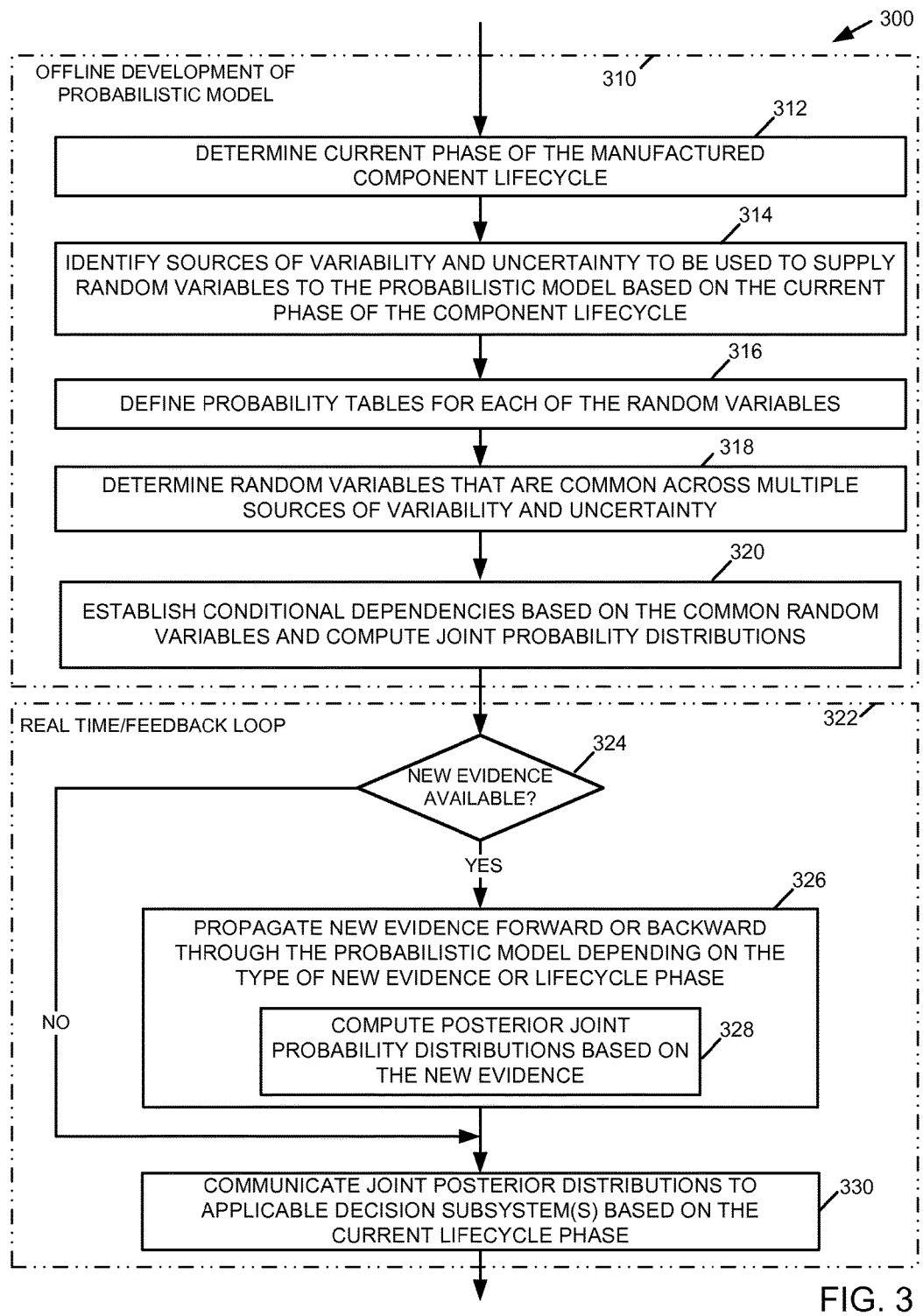
FIG. 3 is a simplified flow diagram of at least one embodiment of method for integrating the design and field management of manufactured components using a probabilistic model, which may be executed by the computing system of FIG. 1.

Referring now to FIG. 3, an illustrative method 300 for integrating diverse sources of variability and uncertainty with a probabilistic model over the lifecycle of a manufactured component is shown. Aspects of the method 300 may be embodied as computerized programs, routines, logic and/or instructions executed by the computing system 100, for example by one or more of the modules 138, 140, 142 alone or in combination with other components of the computing device 110. Portion 310 of the method 300 represents steps or processes that may be executed by the computing device 110 offline (e.g., as an initialization procedure or periodic update), in order to establish and develop the probabilistic model 222 for a particular phase of a manufactured component's lifecycle. Of course, aspects of the portion 310 may be performed online as may be needed or desired, according to the requirements or implementation of a particular embodiment. At block 312, the computing system 100 determines the current phase of the component's lifecycle. To do this, the computing system 100 may receive (e.g., by the user interface subsystem 130 or by an automated process passing a parameter) input indicating or selecting the current lifecycle phase.

At block 314, the computing system 100 determines the sources of variability and uncertainty 210 to be used to establish the random variables for the probabilistic model 222, based on the lifecycle phase determined at block 312. For example, if the lifecycle phase determined at block 312 is a pre-production certification phase such as a design or testing phase, the sources of variability and uncertainty 210 determined at block 314 may include a number of different high-fidelity physics-based models and/or other development models. At block 316, the computing system 100 selects, based on the sources 210 identified at block 314, the random variables to be included in the probabilistic model 222, and defines the probability tables for each of the selected random variables. To do this, the computing system 100 may, for example, obtain the random variable selections from a model designer or other computing device user via a user interface device of the user interface subsystem 130. For example, the computing device 110 may present a graphical user interface on the display 126, which displays a number of different selectable items indicating the random variable options, and receive the user's selections by way of mouse clicks, touches or taps on a touchscreen, voice input, or other methods of user-device interfacing. Similarly, to define the probability tables, the computing system 100 may present a graphical user interface on the display 126 that allows the user to input data for the probability tables. Alternatively or in addition, the probability tables may be instantiated with probability values through an automated process in which the values are obtained from, e.g., analysis models, engine instrumentation or sensors, data files or database tables of external systems and used to populate the probabilistic model 222.

At block 318, the computing system 318 identifies, of the random variables selected at block 318, random variables that are common to more than one of the sources of variability and uncertainty 210. To do this, the computing system 100 may, for example, execute a query to find the common random variables, or present a user interface to enable the user to interactively identify or select the common random variables. At block 320, the computing system 100 computes the Bayesian posterior distributions for each of the random variables (or "nodes" in the Bayesian network), based on current Bayesian prior information contained in probability tables established at block 318, and computes the joint probability distribution or distributions for the probabilistic model 222. To do this, the computing system 100 executes programming instructions to apply Bayes' Theorem to the probabilistic model 222. HUGIN DEVELOPER is one example of a tool that can be used to create a Bayesian Network.

Portion 322 of the method 300 includes steps or processes that may be executed in real time, e.g., as a feedback loop, to continuously update the probabilistic model 222 and provide decision support services to end users of, for instance, the component design subsystem 140 and/or the field management subsystem 142. Of course, aspects of the portion 322 may be performed offline as may be needed or desired, according to the requirements or implementation of a particular embodiment. At block 324, the computing system 100 determines whether new evidence is available to update the probabilistic model 222. To do this, the computing system 100 may receive an indication of new information by user input (e.g., by the user interface subsystem 130) or may simply receive the new information in an automated fashion (e.g., by a computer program passing the new information from one of the sources of variability and uncertainty 210 to the system 136 as new parameters values). If the computing system 100 determines at block 324 that new evidence is available, the computing system 100 proceeds to block 326. If the computing system 100 determines at block 324 that new evidence is not available, the computing system 100 proceeds to block 330. In other words, an embodiment of the portion 322 may continuously or periodically check for new evidence during the use of the system 136 or as a background process, for example.

At block 326, the computing system 100 propagates the new evidence forward or backward through the probabilistic model 222, depending on the type of new evidence or the current phase of the component lifecycle. To do this, the computing system 100 may execute programming code to implement one or more of the mathematical techniques described above, such as one or more adaptation algorithms or uncertainty quantification methods (e.g., intrusive and non-intrusive methods), and compute the posterior joint probability distributions for the probabilistic model 222 based on the new evidence (block 328). As an example, if the new evidence pertains to the result of a finite element analysis of a component part, the computing system 100 may forward-propagate the new evidence through probabilistic model 222 (e.g., to update a performance or lifing prediction); whereas if the new evidence includes data or observations collected during operational use or maintenance of the component, the computing system 100 may back-propagate the new evidence through the probabilistic model 222 (e.g., to update a physics-based model or other computational model used in the design of the component). At block 330, the computing system 100 periodically or continuously communicates the joint posterior distributions computed at blocks 326, 328 to the component design subsystem 140, the field management subsystem 142, and/or other systems or services as needed or requested. As shown in block 330, the communications made by the computing system 100 may be determined based on the current lifecycle phase (e.g., the lifecycle phase detected at block 312). For example, if the current lifecycle phase is a pre-production certification phase, such as a design or testing phase, the computing system 100 may communicate the joint posterior distributions to the component design subsystem 140 but not the field management subsystem 142. Similarly, if the current lifecycle phase is a post-production certification phase such as use or service, the computing system 100 may communicate the joint posterior distributions to the field management subsystem 142 but not the component design subsystem 140. In turn, the subsystems 140, 142 may execute programming code to convert the joint posterior distributions to parameters that then serve as new inputs to one or more of the sources of variability and uncertainty 210 (e.g., analytical models, etc.).

Figure 4:
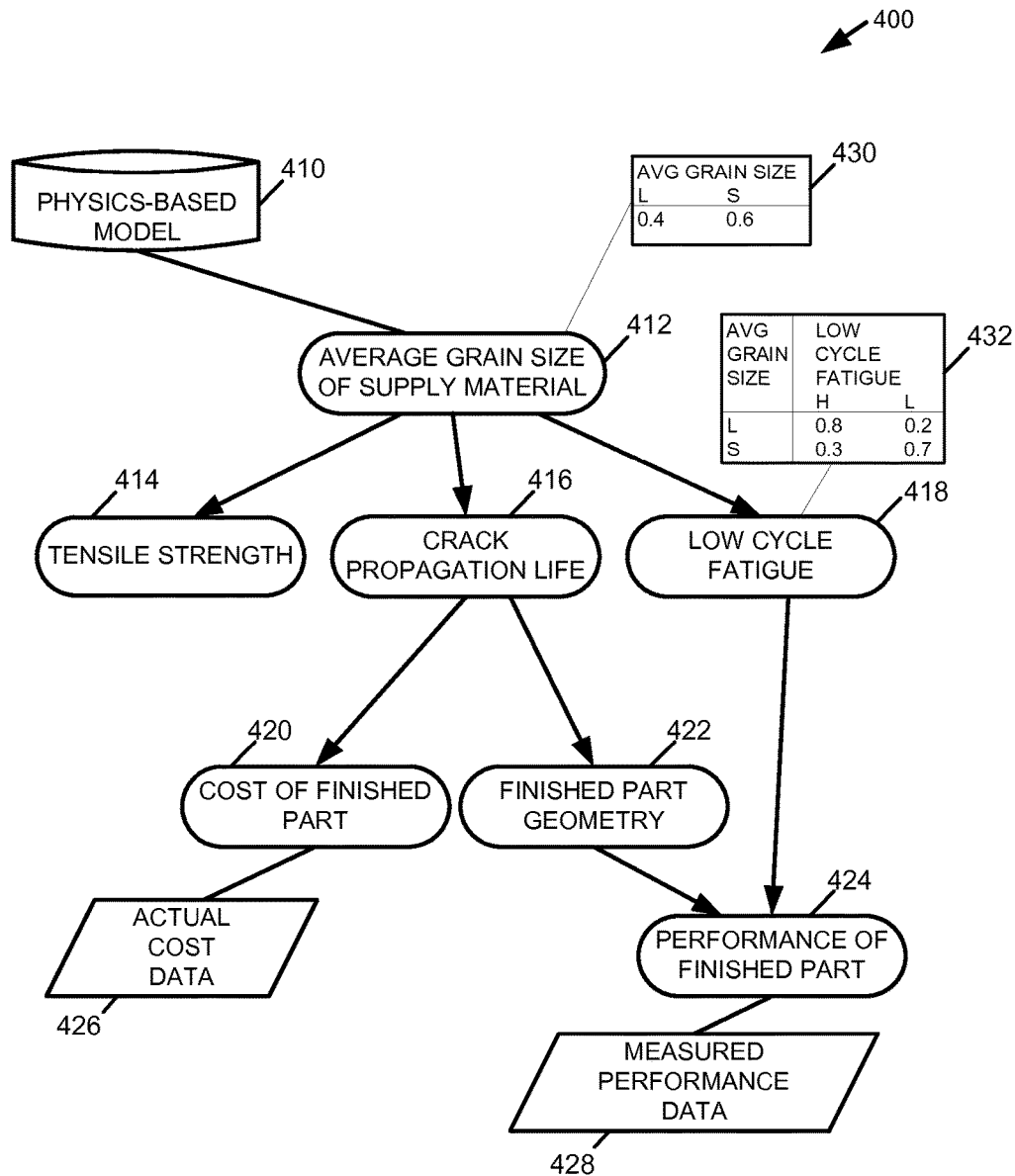
FIG. 4 is an example of a probabilistic graphical model integrating sources of uncertainty involved in the design and field management of a manufactured component, as disclosed herein.

Referring now to FIG. 4, an illustrative example 400 of the probabilistic model 222 is shown. In the example 400, the physics-based model 410, the actual cost data 426, and the measured performance data 428 represent sources of variability and uncertainty 210, which are linked, respectively, to the random variables or "nodes," 412, 420, 424. The physics-based model 410 represents an example of a source 210 that typically relates to a pre-production certification phase of the component lifecycle, while the actual cost data 426 and the measured performance data 428 represent examples of sources 210 that typically relate to post-production certification phases of the component lifecycle. These sources 210 are connected by the e.g., Bayesian network 400, through common random variables, crack propagation life 416 and low cycle fatigue 418. The single-direction arrows connecting each of the nodes or random variables in the network 400 (e.g., the nodes 412, 414, 416, 418, 420, 422, 424) represent the conditional dependencies between the random variables. The elements 430 and 432 are examples of probability tables that may be associated with the random variables 412, 418, respectively. Of course, each of the nodes 412, 414, 416, 418, 420, 422, 424 has an associated probability table, but only two examples are shown in FIG. 4, for simplicity.

The example model 400 illustrates that physics-based functional models (such as bulk and surface residual stress, tensile strength, and low cycle fatigue) can reveal important correlations among other random variables important to decision makers (such as probability of failure for and between various failure modes). Such correlations can be important for component designers to understand during development. For instance, average grain size in some metals is generally believed by experts to be negatively correlated with tensile strength and low cycle fatigue life, but positively correlated with crack propagation life. However, microstructural characteristics of the material (such as average grain size and other material characteristics originating prior to the condition of supply) arise naturally during manufacturing and can also be correlated to changes in finished part geometry, cost, and performance. Correlations may exist, for example, between uncertainties in blade vibratory stress, blade stress rupture life, condition of supply, and inspection capabilities. Such functional and cross-functional relationships can be important to understand over a product's life cycle and can be quantified in a mathematically rigorous way (using, e.g., a Bayesian network), as disclosed herein. With the passage of time, Bayesian posterior distributions computed by the Bayesian network can help stakeholders quantify how prior understanding should change in light of the new information. New information can come from model updates, evolving expert knowledge, or empirical data, for example. Accordingly, the probabilistic model 222 can be used to represent both qualitative and quantitative sources of uncertainty and changes in understanding over the entire component lifecycle. For gas turbine component design in particular, this advantage means that different stakeholders can assess a large array of design requirements, cost, and performance characteristics simultaneously over the lifecycle of the product.

Figure 5:
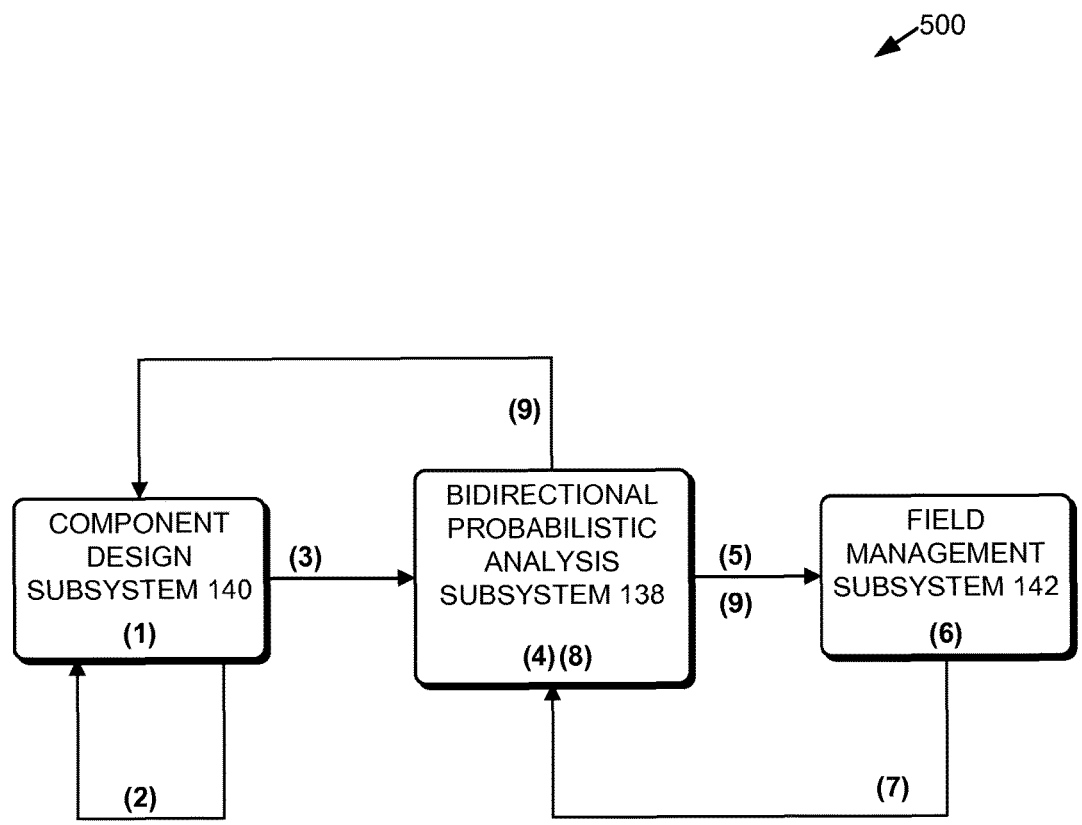
FIG. 5 is a simplified flow diagram of a feedback process that may be executed by the computing system of FIG. 1.

Referring now to FIG. 5, a simplified example of a feedback process 500 that may be executed by the computing system 100 to integrate gas turbine engine component development and service data and functionality across the component lifecycle is shown. With the component design subsystem 140, the process 500 initializes a component design (using, e.g., a solid modeling program) by defining an initial set of design parameters according to, for example, the mission requirements for the component, at step (1). The component design is iterated and "optimized" through testing and a model of the stochastic system is developed, at step (2). At step (3), the baseline capabilities of the component design are summarized and exposed to the probabilistic model 222 of the bidirectional probabilistic analysis subsystem 138 (e.g., Bayesian network). At step (4), portions of the probabilistic model 222 (e.g., probability tables and joint probability distributions) are updated with information developed during steps (1) and (2). At step (5), the information developed during steps (1) and (2), such as the baseline component capabilities and/or results of testing and optimization of the component design, is forward-propagated through the probabilistic model 222 to update or supplement sources of variability and uncertainty 210 that are leveraged by the field management subsystem 142. At step (6), measurements and other data resulting from the operational use of the finished component are obtained by the field management subsystem 142. At step (7), portions of the probabilistic model 222 are updated with information obtained during step (6). At step (8), the time-indexed capabilities of the finished component, as determined from the measurements and other data obtained at step (6) are summarized, and at step (9), the process propagates (forward and/or backward) the updates through the analytical/empirical framework (e.g., to update the empirical data 120, analytical models 122, or knowledge bases 124) through the relationships defined by the nodes of the probabilistic model 222.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A gas turbine engine lifecycle decision assistance system for quantifying uncertainties during the lifecycle of one or more gas turbine engine components, the system comprising:
   a processor; and
   one or more machine-accessible storage media coupled to the processor, the one or more machine-accessible storage media comprising:
   a bidirectional probabilistic analysis subsystem comprising a probabilistic model of conditional dependencies between a plurality of random variables associated with a plurality of different sources of uncertainty in the gas turbine engine component lifecycle, wherein each source of uncertainty is associated with a random variable of the plurality of random variables, and wherein the probabilistic model includes an acyclic directed graph that includes a plurality of nodes and one or more edges, wherein each node corresponds to a random variable of the plurality of variables, and wherein each edge corresponds to a conditional dependency between a pair of random variables, the probabilistic model arranged to connect at least two of the plurality of different sources of uncertainty by a common random variable of the plurality of random variables, the bidirectional probabilistic analysis subsystem to, when executed by the processor:
   compute a joint probability distribution for the probabilistic model;
   periodically receive new evidence from one or more of the different sources of uncertainty over the course of the component lifecycle;
   in response to the new evidence, re-compute the joint probability distribution;
   determine a current phase of the gas turbine engine component lifecycle, wherein the current phase comprises a pre-production certification phase or a post-production certification phase;
   communicate the re-computed joint probability distribution to a component design subsystem in response to determining the current phase is the pre-production certification phase; and
   communicate the re-computed joint probability distribution to a field management subsystem in response to determining the current phase is the post-production certification phase, wherein the one or more machine-accessible storage media comprises the component design subsystem and/or the field management subsystem.

2. The system of claim 1, wherein the bidirectional probabilistic analysis subsystem, when executed by the processor, computes the joint probability distribution in response to a request for a quantification of uncertainty relating to an aspect of the gas turbine engine component lifecycle.

3. The system of claim 2, wherein the bidirectional probabilistic analysis subsystem, when executed by the processor, receives the request from the component design subsystem and/or the field management subsystem.

4. The system of claim 1, wherein the bidirectional probabilistic analysis subsystem, when executed by the processor, connects the plurality of different sources of uncertainty in the gas turbine engine component lifecycle to the probabilistic model, and wherein at least one of the different sources of uncertainty relates to the pre-production certification phase of the component lifecycle and at least one of the different sources of uncertainty relates to the post-production certification phase of the component lifecycle.

5. The system of claim 1, wherein the bidirectional probabilistic analysis subsystem, when executed by the processor, connects the plurality of different sources of uncertainty in the gas turbine engine component lifecycle to the probabilistic model, and wherein at least one of the different sources of uncertainty relates to the pre-production certification phase of the component lifecycle including one or more of a design phase, a manufacture phase, and a test phase.

6. The system of claim 1, wherein the bidirectional probabilistic analysis subsystem, when executed by the processor, connects the plurality of different sources of uncertainty in the gas turbine engine component lifecycle to the probabilistic model, and wherein at least one of the different sources of uncertainty relates to the post-production certification phase of the component lifecycle including one or more of a use phase, and a service phase.

7. The system of claim 1, wherein the bidirectional probabilistic analysis subsystem, when executed by the processor, connects the plurality of different sources of uncertainty in the gas turbine engine component lifecycle to the probabilistic model, and wherein the plurality of different sources of uncertainty include at least one analytical model, at least one source of empirical data, and at least one source of expert knowledge.

8. A method for quantifying uncertainty during different phases of the lifecycle of a manufactured component, the method comprising, with at least one computing device:
   identifying at least two sources of uncertainty that are associated with different phases of the manufactured component lifecycle, wherein each source of uncertainty is associated with a random variable of a plurality of random variables;
   connecting the at least two sources of uncertainty by a common random variable of the plurality of random variables in a Bayesian network, wherein the Bayesian network includes an acyclic directed graph that includes a plurality of nodes and one or more edges, wherein each node corresponds to a random variable of the plurality of variables, and wherein each edge corresponds to a conditional dependency between a pair of random variables;

computing a joint probability distribution for the Bayesian network using the common random variable and at least one random variable associated with each of the at least two sources of uncertainty;

determining a current phase of the manufactured component lifecycle, wherein the current phase comprises a pre-production certification phase or a post-production certification phase;

communicating the re-computed joint probability distribution to a component design subsystem in response to determining the current phase is the pre-production certification phase; and communicating the re-computed joint probability distribution to a field management subsystem in response to determining the current phase is the post-production certification phase.

9. The method of claim 8, comprising receiving new evidence relating to at least one of the random variables and propagating the new evidence through the Bayesian network.

10. The method of claim 9, comprising forward-propagating the new evidence through the Bayesian network if the new evidence relates to the pre-production certification phase of the gas turbine engine lifecycle.

11. The method of claim 10, comprising back-propagating the new evidence through the probabilistic model if the new evidence relates to the post-production certification phase of the gas turbine engine lifecycle.

12. The method of claim 8, comprising computing the joint probability distribution in response to a request for a quantification of uncertainty relating to an aspect of the manufactured component lifecycle.

13. The method of claim 12, comprising receiving the request from the component design subsystem and/or the field management subsystem.

14. The method of claim 8, comprising connecting a source of uncertainty relating to the pre-production certification phase of the component lifecycle to the Bayesian network.

15. The method of claim 8, comprising connecting a source of uncertainty relating to the post-production certification phase of the component lifecycle to the Bayesian network.

16. The method of claim 8, comprising connecting at least one analytical model, at least one source of empirical data, and at least one source of expert knowledge to the Bayesian network.

17. The method of claim 16, comprising propagating output of the at least one analytical model, output of the at least one source of empirical data, and output of the at least one source of expert knowledge through the Bayesian network.

18. A gas turbine engine lifecycle decision assistant for quantifying uncertainties during the lifecycle of a gas turbine engine component, the gas turbine engine lifecycle decision assistant comprising: computer program instructions embodied in one or more machine-accessible storage media and executable by at least one processor to:

create a Bayesian network of conditional dependencies between a plurality of random variables associated with a plurality of different sources of uncertainty in the gas turbine engine component lifecycle, wherein each source of uncertainty is associated with a random variable of the plurality of random variables, and wherein the Bayesian network includes an acyclic directed graph that includes a plurality of nodes and one or more edges, wherein each node corresponds to a random variable of the plurality of variables, and wherein each edge corresponds to a conditional dependency between a pair of random variables, the Bayesian network arranged to connect at least two of the plurality of different sources of uncertainty by a common random variable of the plurality of random variables;

compute a joint probability distribution for the Bayesian network;

receive new evidence from one or more of the different sources of uncertainty over the course of the component lifecycle;

in response to the new evidence, re-compute the joint probability distribution;

determine a current phase of the gas turbine engine component lifecycle, wherein the current phase comprises a pre-production certification phase or a post-production certification phase;

communicate the re-computed joint probability distribution to a component design subsystem in response to determining the current phase is the pre-production certification phase; and communicate the re-computed joint probability distribution to a field management subsystem in response to determining the current phase is the post-production certification phase.

19. The gas turbine engine lifecycle decision assistant of claim 18, wherein the computer program instructions are to compute the joint probability distribution in response to a request for a quantification of uncertainty relating to an aspect of the gas turbine engine component lifecycle, and wherein the computer program instructions are to receive the request from the component design subsystem and/or the field management subsystem.

20. The gas turbine engine lifecycle decision assistant of claim 18, wherein the computer program instructions are to connect the plurality of different sources of uncertainty in the gas turbine engine component lifecycle to the Bayesian network, and wherein at least one of the different sources of uncertainty relates to the pre- production certification phase of the component lifecycle and at least one of the different sources of uncertainty relates to the post-production certification phase of the component lifecycle, and wherein the plurality of different sources of uncertainty include at least one analytical model, at least one source of empirical data, and at least one source of expert knowledge.

* * * * *